United States Patent [19]

Tamarkin

[11] Patent Number: 5,658,450
[45] Date of Patent: *Aug. 19, 1997

[54] METHOD OF AND DEVICE FOR INDUSTRIAL WASTE WATER TREATMENT

[76] Inventor: Semyon Tamarkin, 11 Lincoln Ave., West Orange, N.J. 07052

[*] Notice: The term of this patent shall not extend beyond the expiration date of Pat. No. 5,385,653.

[21] Appl. No.: 497,851

[22] Filed: Jul. 3, 1995

[51] Int. Cl.$^6$ .................................... C02F 1/461
[52] U.S. Cl. ................ 205/745; 205/751; 205/752; 205/754; 205/760; 204/248; 204/249; 204/275; 204/276; 204/277
[58] Field of Search ........................ 204/150, 152, 204/248, 249, 275, 276, 277; 205/745, 751, 752, 754, 760

[56] References Cited

U.S. PATENT DOCUMENTS

| | | | |
|---|---|---|---|
| 564,940 | 7/1896 | Sellers | 204/150 |
| 1,058,113 | 4/1913 | Stuckel | 204/150 |
| 5,385,653 | 1/1995 | Tamarkin | 204/150 |

FOREIGN PATENT DOCUMENTS

| | | | |
|---|---|---|---|
| 1611886 | 12/1990 | U.S.S.R. | 204/150 |

Primary Examiner—Arun S. Phasge
Attorney, Agent, or Firm—Ilya Zborovsky

[57] ABSTRACT

Waste water is purified by passing through a vessel in which small particles of insoluble cathodes interact with anodes to form galvanic couples. During this process, chemical reduction of ions of heavy metals in the water occurs by ions and hydroxides formed during electrochemical dissolution of anodes. The hydroxides are an excellent coagulating agent which absorbs impurities contained in the water. Pressurized air can saturate the waste water simultaneously with passing through the vessel with anodes in order to produce process floatation using hydroxides as coagulant. The temperature of the waste water can be increased in order to intensity the process of treatment.

8 Claims, 1 Drawing Sheet

METHOD OF AND DEVICE FOR INDUSTRIAL WASTE WATER TREATMENT

BACKGROUND OF THE INVENTION

The present invention provides for treatment of water, waste water contaminated with ions of heavy metals and organic contaminations that are in suspension and emulsion forms.

They are especially recommended for waste water a) from galvanic processes during chemical and electrochemical treatment of steel (chromizing, passivation, etching, etc.), b) from production of microelectronic elements such as printed circuit, e) for waste water containing hydroxides of heavy metals, d) for waste water containing oil, fat petroleum, products of organic synthesis, paints, finely dispersed suspended products, and products having a hydraulic size up to 0.01 mm/sc, as well as for combinations of the above.

Methods of and device for waste water treatment are known in many modifications. One of such methods and devices is disclosed, for example, in my U.S. Pat. No. 5,385,653. It is advisable to provide new and improved methods and devices of this type.

SUMMARY OF THE INVENTION

Accordingly, it is an object of the present invention to provide a method of and a device for treatment of waste water which are further improvements of existing methods and devices.

In keeping with these objects and with others which will become apparent hereinafter, one feature of the present invention resides, briefly stated, in a method and a device in which correspondingly steps and means ar provided for supplying particles of insoluble cathodes, mixing in soluble cathodes particles with anodes particles so as to form galvanically produced coagulating agent, and passing waster water through the thusly produced coagulating agent so as to absorb impurities from waste water. The new method and device thus involve a galvanocoagulation of the impurities.

In accordance with other features of the present invention:

a) Pressurized air saturates the waste water simultaneously with the galvanocoagulation, so that the galvanocoagulation is combined with pressure floatation.

b) There is the temperature increasing of the treated waste water for the methods above in order to intensify the process of treatment.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
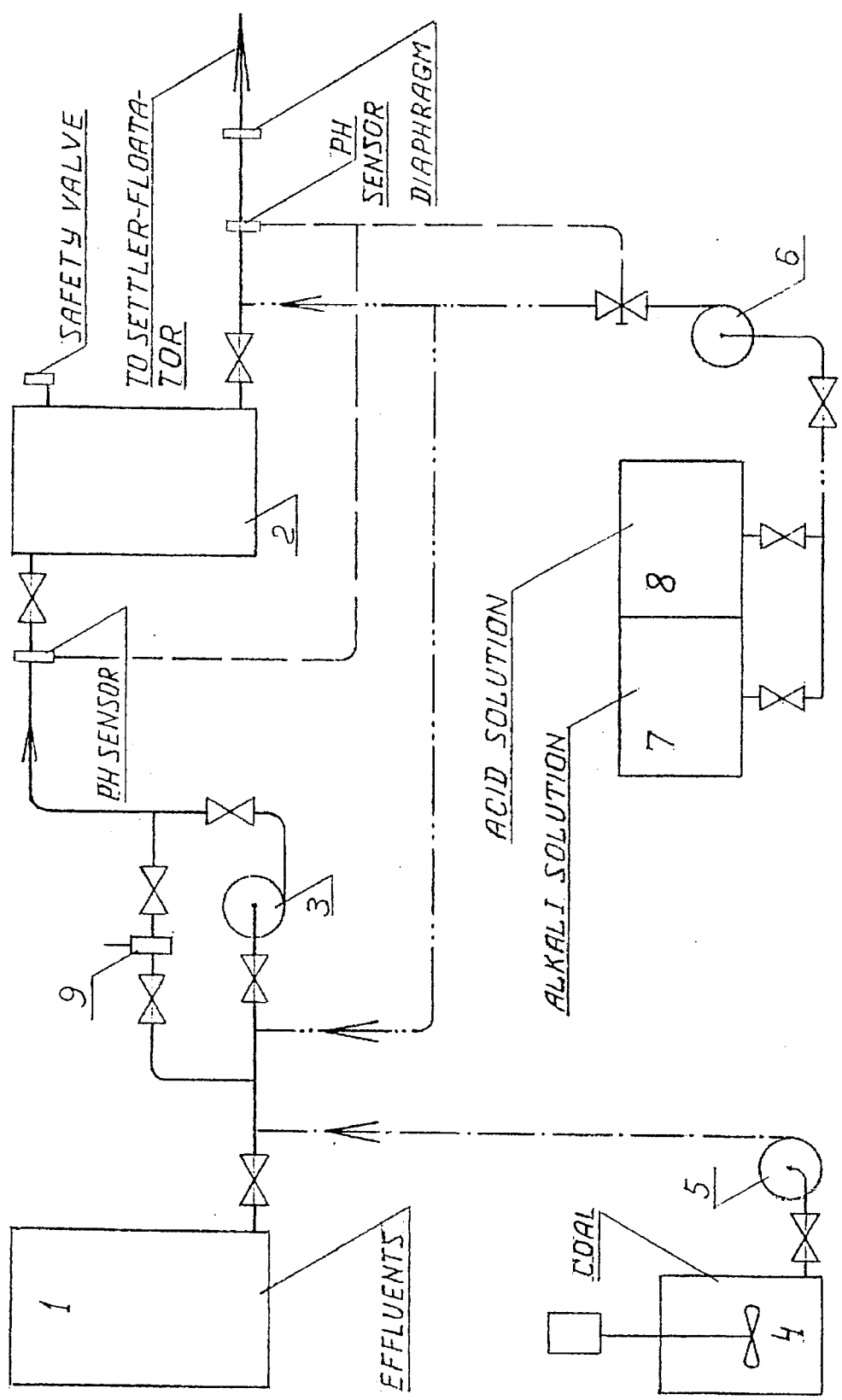
FIG. 1 is a view schematically showing a method and a device for industrial waste water treatment in accordance with the present invention.

In accordance with the present invention, waste water which has to be purified is mixed with a solution of small particles of the insoluble cathodes. The cathodes are made of a material having the potential is higher than the potential of the soluble anode. For example, the coal, graphite, coke, etc. can work as an insoluble cathodes with metal soluble anodes. Then the waste water is supplied into a pressure vessel loaded with soluble anode. The insoluble cathodes form with anodes a lot of galvanic couples. During this process, chemical reduction of ions of heavy metals in waste water occurs by ions and hydroxides formed during electrochemical dissolution of anodes.

The process of galvanocoagulation can be intensified by increasing the temperature of the treated water up to 60°–80° C. Under this condition the hydraulic size of the particles of sediment increasing in 2–3 times up to 0.6–0.9 mm/sec and solid phase of hydroxides are obtaining ferromagnetic properties resulting decrease of volume of settler-floatators.

For example for chromium the reaction is as follows:

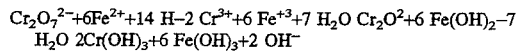

$Cr_2O_7^{2-}+6Fe^{2+}+14\ H-2\ Cr^{3+}+6\ Fe^{+3}+7\ H_2O\ Cr_2O^2+6\ Fe(OH)_2-7\ H_2O\ 2Cr(OH)_3+6\ Fe(OH)_3+2\ OH^-$

The ferrous hydroxide is an excellent coagulating agent which absorbs impurities contained in the waste water.

For waste water, which contains oil, fat, petroleum products, finely dispersed suspended particles, ions of heavy metals, etc., the galvanocoagulation is combined with pressure floatation.

After treatment of galvanocoagulation alone or in combination with pressure floatation, the waste water is supplied to clarifier, or to clarifier-floatators, etc., which are well known and provide settling of hydroxides of heavy metals, removal of sediment, etc.

The operation parameters are selected in accordance with initial characteristics of the waste water.

An example of the present invention is given hereinbelow for treatment of waste water from conventional galvanic production of printed circuits which predominantly contain ions of hexavalent chromium. In this case the cole is selected as insoluble cathode and iron is selected as anode.

As can be seen from FIG. 1 the waste water from a receiving reservoir 1 is supplied by a pump 3 into a pressure vessel 2. pH of the waste water must be not less than 5.5 before the pressure vessel and 8–10 after the pressure vessel (natural growth pH after the vessel is 1–4). If it is necessary the waste water is adjusted by supplying corresponding pH adjusting agents from vessels 7 and 8 by a pump 6 in automatic mode.

A solution of small particles of coal with the size of 0.4 mm and less is supplied into a suction line of the pump 3 by pump 5. Coal can be charged into a tank with a stirrer 4 once per 1 shift. The solution in the tank is prepared with the initial waste water. In order to remove from the waste water 1 g of cadmium, nickel chromium (hexavalent) the consumption of iron is 3.5–6.5 g. In order to remove fluorine ions an aluminum charge can be used with 2–6 g of aluminum per 1 g of fluorine to be removed. The time of passage of the waste water through the pressure vessel is 1–5 min depending on the initial concentration, and the speed is approximately 2 m per 1 min. This is the time and speed of galvanocoagulation.

Thereafter the waste water is supplied to conventional clarifier or clarifier-floatators for removal of hydroxides of heavy metals, treatment of the sediment, etc. The purification degree reaches 99%.

In accordance with another embodiment of the invention, the galvanocoagulation is combined with a pressure floatation. This method is recommended for waste water in point d) (page 2).

As shown in FIG. 1, the waste water is supplied from a reservoir 1 by a pump 3. An ejector 9 supplies air with the volume equal to 3–5% of the volume of the waste water to be treated. Also a solution of small coal particles with the quantity of 1.5–6 g per 1 g of impurities to be removed is supplied by the pump 5. If necessary pH of the waste water can be adjusted by supplying of pH adjusting agent from the tanks 7 and 8 to maintain pH within 5.5–10. The time of contact of waste water with the galvanocoagulation pressure vessel is not less than 1–2 min. The consumption of metal is 2–6 g per 1 g impurities to be removed. Two processes occur in the pressure vessel, namely:

Process of saturation of waste water with air under pressure; and

Process of galvanocoagulation with chemical reduction of ions of heavy metals and formation of hydroxide of iron $Fe(ON)_2$ acting as a coagulant.

Before the clarifiers-floatators a diaphragm is provided in order to reduce pressure and form and expand air bubbles with further continuation of the process on the clarifiers-floatators.

As an option the water heater 10 can be installed for intensification of the process of treatment.

The inventive method and device for galvanocoagulation have several advantages when compared with conventional electrocoagulation, in particular they do not use electricity, they provide more intensive chemical processes due to larger electrode surfaces as a result of contact of a great number of cathode particles with anodes, and due to pressure conditions and therefore have substantially higher output, they have a simpler and better adjustable technological process, the cost of purification of 1 $m^3$ of waste water is 20–30% lower with the use of the combined approach including the galvanocoagulation and pressure floatation the costs are reduced by 30–50% relative to the conventional methods.

The invention is not limited to the details shown, since various modifications and structural changes are possible without departing in any way from the spirit of the present invention.

What is desired to be protected by Letters Patent is set forth in the appended claims.

I claim:

1. A method of treatment of waste water, comprising the steps of loading a vessel with particles of soluble anodes; pumping waste water heated to 60°–80° C. to the vessel through a line; supplying into the waste water air with the volume of 3–5% of a volume of the waste water; supplying particles of insoluble cathodes composed of a material having a potential which is higher than a potential of the anodes, into the line through which the waste water is pumped to the vessel; passing the particles of insoluble cathodes with waste water through the vessel loaded with particles of anodes to form galvanic couples which provide chemical reduction of ions of heavy metals and formation of hydroxides to form a coagulating agent which absorbs impurities contained in the waste water; and reducing a pressure and forming and expanding air bubbles after the vessel by providing after the vessel a diaphragm.

2. A method as defined in claim 1; and further comprising the step of supplying pressurized air into the line through which the waste water is dumped to the vessel in order to make more intensive process of treatment.

3. A method as defined in claim 1; and further comprising the step of removing the coagulating agent from the waste water.

4. A method as defined in claim 1; and further comprising the step of increasing the temperature of the treated waste water in order to intensify the process of treatment.

5. A device for treatment of waste water, comprising vessel means for accommodating anodes particles; pumping means for pumping waste water to said vessel means through a line; means for heating the waste water 60°–80° C.; means for supplying into the waste water air with the volume of 3–5% of a volume of the waste water; means for supplying insoluble cathodes particles into said line through which the waste water is pumped to the vessel so that, cathodes particles with waste water pass through said vessel with anodes particles so as to form galvanic couples which provide chemical reduction of ions of heavy metals and formation of hydroxides to form a coagulating agent which absorbs impurities from the waste water; and means for reducing a pressure and forming and expanding air bubbles after the vessel by providing after the vessel a diaphragm.

6. A device as defined in claim 5; and further comprising means for supplying pressurized air into said line through which the waste water is pumped to said vessel.

7. A device as defined in claim 5; and further comprising means for removing the coagulating agent from the waste water.

8. A device as defined in claim 5; and further comprising means for increasing the temperature of treated waste water.

* * * * *